(12) United States Patent
Greiveldinger et al.

(10) Patent No.: US 10,889,146 B2
(45) Date of Patent: Jan. 12, 2021

(54) TIRE OBJECT PROVIDED WITH AN ELASTOMER LAYER MADE OF A THERMOPLASTIC ELASTOMER IN THE FORM OF AN (A-B-(A-METHYLSTYRENE-CO-B))N-B-C BLOCK COPOLYMER

(71) Applicant: COMPAGNIE GENERALE DES ETABLISSEMENTS MICHELIN, Clermont-Ferrand (FR)

(72) Inventors: Marc Greiveldinger, Clermont-Ferrand (FR); Emmanuel Custodero, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 528 days.

(21) Appl. No.: 15/556,169

(22) PCT Filed: Mar. 8, 2016

(86) PCT No.: PCT/EP2016/054912
§ 371 (c)(1),
(2) Date: Sep. 6, 2017

(87) PCT Pub. No.: WO2016/142379
PCT Pub. Date: Sep. 15, 2016

(65) Prior Publication Data
US 2018/0043734 A1 Feb. 15, 2018

(30) Foreign Application Priority Data
Mar. 9, 2015 (FR) ...................... 15 51942

(51) Int. Cl.
*B60C 5/14* (2006.01)
*B60C 1/00* (2006.01)
(Continued)

(52) U.S. Cl.
CPC .............. *B60C 1/0008* (2013.01); *B60C 5/14* (2013.01); *C08F 297/00* (2013.01); *C08L 53/00* (2013.01); *C08L 2201/14* (2013.01)

(58) Field of Classification Search
CPC ... B60C 1/008; B60C 5/14; B60C 5/152; B60C 2005/145; B60C 2005/147
See application file for complete search history.

(56) References Cited

U.S. PATENT DOCUMENTS

| 4,946,899 A | 8/1990 | Kennedy et al. |
| 5,260,383 A | 11/1993 | Osman |
(Continued)

FOREIGN PATENT DOCUMENTS

| EP | 0731112 A2 | 9/1996 |
| EP | 2 634 215 A1 | 9/2013 |
(Continued)

OTHER PUBLICATIONS http://polymerprocessing.com/polymers/PIB.html, no date.*
(Continued)

*Primary Examiner* — Justin R Fischer
(74) *Attorney, Agent, or Firm* — Venable LLP

(57) ABSTRACT

A pneumatic object is provided with an elastomer layer which is gastight to inflation gases, said elastomer layer comprising, as predominant elastomer, a thermoplastic elastomer in the form of a block copolymer which comprises: (a) an elastomeric block comprising at least units derived from isobutylene, and having a glass transition temperature of less than or equal to −20° C., and (b) one or more thermoplastic blocks, the thermoplastic block(s) each comprising at least one first block consisting of units derived from at least one polymerizable monomer and at least one second block, said second block(s) being a random copolymer consisting of units derived from α-methylstyrene and of units derived (Continued)

from β-pinene. A process for rendering a pneumatic object gastight to inflation gases is also disclosed.

33 Claims, 1 Drawing Sheet

(51) Int. Cl.
*C08F 297/00* (2006.01)
*C08L 53/00* (2006.01)

(56) References Cited

U.S. PATENT DOCUMENTS

| | | | |
|---|---|---|---|
| 5,721,331 | A | 2/1998 | Shachi et al. |
| 5,855,972 | A * | 1/1999 | Kaeding ............ E06B 3/66328 428/34 |
| 7,820,771 | B2 | 10/2010 | Lapra et al. |
| 8,883,929 | B2 | 11/2014 | Gandon-Pain et al. |
| 9,108,466 | B2 | 8/2015 | Lesage et al. ............ B60C 5/14 |
| 9,475,344 | B2 | 10/2016 | Lesage et al. ........ B60C 1/0008 |
| 2008/0132644 | A1 | 6/2008 | Lapra et al. |
| 2009/0270558 | A1 | 10/2009 | Gandon-Pain et al. |
| 2010/0022714 | A1 | 1/2010 | Varagniat et al. |
| 2010/0175804 | A1 | 7/2010 | Lesage et al. ................ 152/511 |
| 2010/0263778 | A1 | 10/2010 | Lesage et al. ................ 152/511 |
| 2011/0021702 | A1 | 1/2011 | Gandon-Pain et al. |
| 2011/0277901 | A1 | 11/2011 | Lesage et al. ................ 152/510 |
| 2012/0208948 | A1 | 8/2012 | Gandon-Pain et al. |
| 2013/0225765 | A1 | 8/2013 | Nakabayashi et al. ....... 525/184 |

FOREIGN PATENT DOCUMENTS

| | | |
|---|---|---|
| FR | 2 916 679 | 12/2008 |
| FR | 2916680 A1 | 12/2008 |
| FR | 2 918 669 | 1/2009 |
| FR | 2 938 546 | 5/2010 |
| JP | 2010-100082 * | 5/2010 |
| WO | 97/36724 A2 | 10/1997 |
| WO | 99/16600 A1 | 4/1999 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |

OTHER PUBLICATIONS

Machine translation of JP 2010-100082, 2010.*
International Search Report dated May 10, 2016, issued by EPO in connection with International Application No. PCT/EP2016/054912.
Zs. Fodor, et al., "Polyisobutylene-containing block polymers by sequential monomer addition", Polymer Bull, vol. 29, pp. 697-704 (1992).
G. Kaszas, et al., "New Thermoplastic Elastomers of Rubbery Polyisbutylene and Glassy Cyclopolyisoprene Segments", J. Appl. Polymer Sci., vol. 39, pp. 119-144 (1990).
J.E. Puskas, et al., "New Transparent Flexible UV-Cured Films from Polyisobutylene-Polyisoprene Block Polymers", J. Macromol. Sci., vol. A28(1), pp. 65-80 (1991).
J.E. Puskas, et al., "Synthesis and Characterization of Novel Dendritic (Arborescent, Hyperbranched) Polyisobutylene-Polystyrene Block Copolymers", J. Polymer Sci.: Part A: Polymer Chemistry, vol. 43, 1811-1826 (2005).
J.E. Puskas, et al., "Multiarm-Star Polyisobutylenes by Living Carbocationic Polymerization", J. Polymer Sci.: Part A: Polymer Chemistry, vol. 36, 85-92 (1998).

* cited by examiner

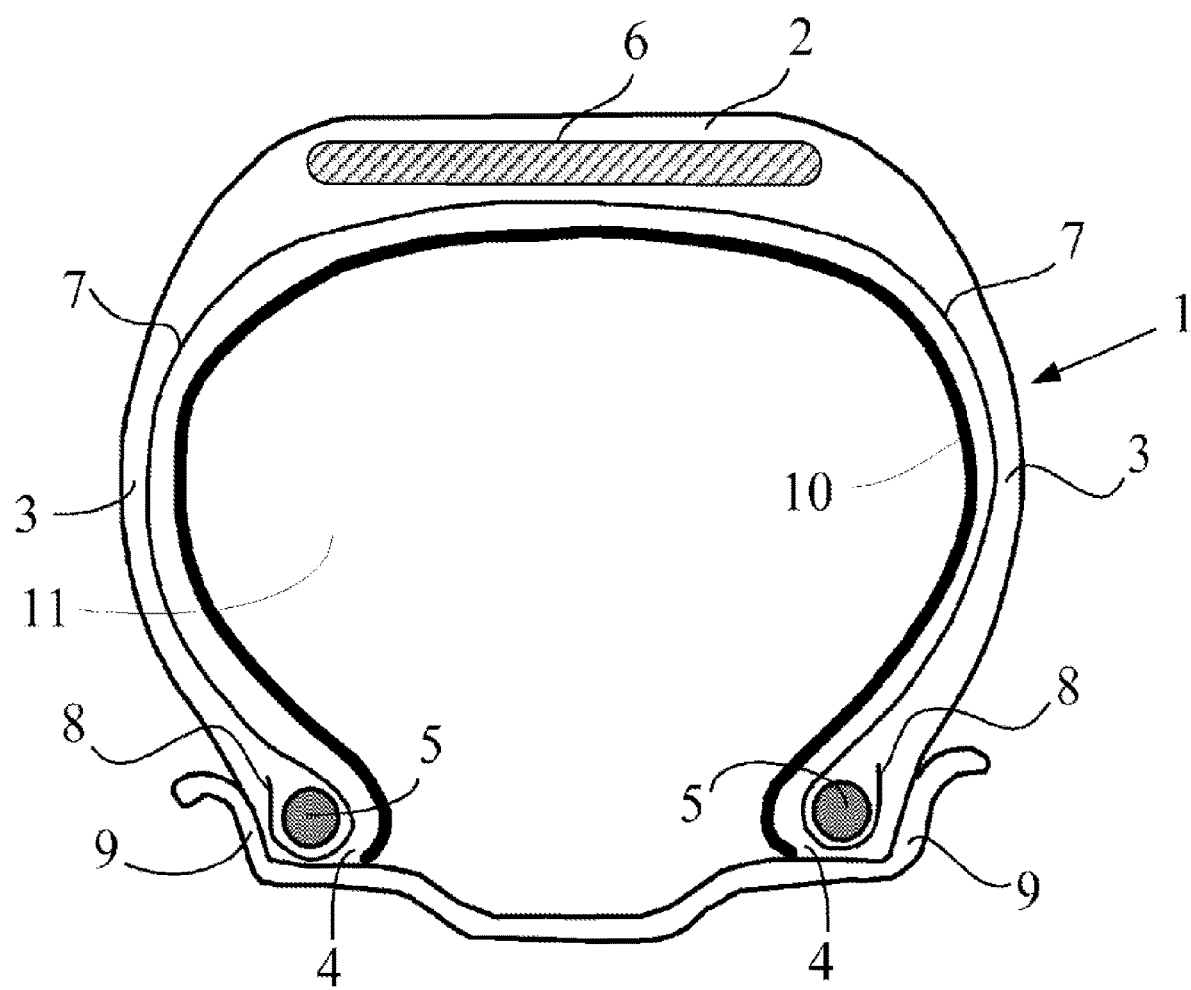

TIRE OBJECT PROVIDED WITH AN ELASTOMER LAYER MADE OF A THERMOPLASTIC ELASTOMER IN THE FORM OF AN (A-B-(A-METHYLSTYRENE-CO-B))N-B-C BLOCK COPOLYMER

FIELD OF THE INVENTION

The present invention relates to "pneumatic" objects, that is to say, by definition, to objects which assume their usable form when they are inflated with air or with an equivalent inflation gas, and in particular to pneumatic tyres.

More particularly, the present invention relates to a pneumatic object provided with an elastomer layer which is gastight to inflation gases, said elastomer layer comprising, as predominant elastomer, a thermoplastic elastomer in the form of a particular block copolymer.

The invention also relates to a process for rendering a pneumatic object gastight by means of the elastomer layer which is gastight to inflation gases as defined above.

Finally, the invention relates to the use, as layer which is gastight to inflation gases, in a pneumatic object, of an elastomer layer as defined above.

RELATED ART

In a conventional tyre of the tubeless type, the radially internal face comprises an airtight layer (or more generally a layer airtight to any inflation gas) which makes it possible to inflate the pneumatic tyre and to keep it under pressure. Its gastightness properties allow it to guarantee a relatively low level of pressure loss, making it possible to keep the tyre inflated in a normal operating state for a sufficient period of time, normally of several weeks or several months. It also has the function of protecting the carcass reinforcement from the diffusion of air originating in the inner space of the tyre.

This role of gastight inner layer or gastight "inner" rubber ("inner liner") is currently fulfilled by compositions based on butyl rubber (copolymer of isobutylene and isoprene), which have been recognized for a very long time for their excellent gastightness properties.

Nonetheless, a well known drawback of compositions based on butyl rubber is that they have large hysteresis losses, which moreover are present over a broad spectrum of temperatures, which is a drawback detrimental to the rolling resistance of the pneumatic tyres.

Reducing the hysteresis of these gastight inner layers and hence eventually the fuel consumption of motor vehicles is a general aim which current technology is confronted with.

Thermoplastic elastomers of the SIBS (styrene-isobutylene-styrene) type have been developed in order to improve the hysteresis properties of the gastight inner layers containing them. Mention may especially be made of patent applications FR 08/57844 and FR 08/57845.

However, the use of formulations based on SIBS as gastight inner layer has drawbacks.

Firstly, the gastight inner layers based on SIBS lack adhesion to the other components of the pneumatic object, both in the uncured state during the building of the tyre and in the cured state with the carcass ply. This is because the absence of double bonds in the thermoplastic elastomer makes it relatively insensitive to co-vulcanization with the carcass ply during curing.

Secondly, the pneumatic objects obtained from these thermoplastic elastomers have limited heat resistance, which is reflected in the impossibility of removing the pneumatic object from the hot curing press without tearing the material, and also by the appearance of material creep during endurance tests which generate stress from a thermomechanical point of view, such as high speed running tests.

There is therefore a need to develop novel pneumatic objects based on a thermoplastic elastomer which can be used as gastight inner layer. These pneumatic objects, while retaining good gastightness properties, must also have a good compromise in terms of adhesion and in terms of heat resistance.

The applicant has now discovered, surprisingly, that a thermoplastic elastomer in the form of a block copolymer which comprises an elastomeric block and one or more thermoplastic blocks, the latter themselves being in the form of a block copolymer, at least one first block of which consists of units derived from at least one polymerizable monomer and at least one second block of which consists of a random copolymer of units derived from α-methylstyrene and of units derived from β-pinene, which can be used as elastomer layer which is gastight to inflation gas in a pneumatic object, made it possible to obtain a pneumatic object having good gastightness to inflation gases, and also a good compromise in terms of adhesion of the elements of the pneumatic object to one another and in terms of heat resistance.

BRIEF DESCRIPTION OF EMBODIMENTS OF THE INVENTION

A subject of the invention is therefore a pneumatic object provided with an elastomer layer which is gastight to inflation gases, said elastomer layer comprising, as predominant elastomer, a thermoplastic elastomer in the form of a block copolymer which comprises:

a) an elastomeric block comprising at least units derived from isobutylene, and having a glass transition temperature of less than or equal to −20° C., b) one or more thermoplastic blocks, the thermoplastic block(s) each comprising at least one first block consisting of units derived from at least one polymerizable monomer and at least one second block, said second block(s) being a random copolymer consisting of units derived from α-methylstyrene and of units derived from β-pinene.

The structure and the particular composition of this block copolymer make it possible to give the gastight layer in the pneumatic object good properties of adhesion, both in the uncured state during building and in the cured state to the rubber components adjacent thereto, in particular to the carcass ply.

This structure and this composition also make it possible to give the pneumatic object good heat resistance, especially in order to avoid tearing of the material when removing the pneumatic object from the curing press but also makes it possible to prevent material creep during the use thereof, in particular during endurance tests which generate stress from a thermomechanical point of view.

Another subject of the invention is a process for rendering a pneumatic object gastight to inflation gases, in which an elastomer layer which is gastight to inflation gases, as defined above, is incorporated into said pneumatic object during the manufacture thereof, or added to said pneumatic object after the manufacture thereof.

Finally, a subject of the invention is the use, as layer which is gastight to inflation gases, in a pneumatic object, of an elastomer layer as defined above.

The invention and its advantages will be easily understood in the light of the description and exemplary embodiments which follow.

BRIEF DESCRIPTION OF THE FIGURE

The single FIGURE diagrammatically represents, in radial cross section, a pneumatic tyre in accordance with the invention.

DETAILED DESCRIPTION OF THE INVENTION

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, "predominant", when denoting an elastomer, is intended to mean that this elastomer is predominant among all the other elastomers present in the elastomer composition or the elastomer layer, that is to say that this elastomer represents more than 50% by weight of all the elastomers present in the elastomer composition or the elastomer layer.

In the present application, the term "parts per hundred parts of elastomer" or "phr" means the part by weight of a constituent per 100 parts by weight of the elastomer(s), i.e. of the total weight of the elastomer(s), whether they are thermoplastic or non-thermoplastic. Thus, a constituent at 60 phr will mean, for example, 60 g of this constituent per 100 g of elastomer.

"Block consisting of units derived from at least one polymerizable monomer" is intended to mean that this block comprises at least one sequence of 5 units derived from at least one polymerizable monomer.

"Random copolymer consisting of units derived from α-methylstyrene and of units derived from β-pinene" is intended to mean that this polymer consists of a random distribution of units derived from α-methylstyrene and of units derived from β-pinene.

"Block being a random copolymer", referred to as second block, is intended to mean that this block comprises at least one sequence of 5 units, said sequence being a mixture of units derived from α-methylstyrene and of units derived from β-pinene.

"Elastomeric block" is intended to mean that this block comprises at least one sequence of 5 units derived from isobutylene.

Thus, a first subject of the invention is a pneumatic object provided with an elastomer layer which is gastight to inflation gases, said elastomer layer comprising, as predominant elastomer, a thermoplastic elastomer in the form of a block copolymer which comprises:

a) an elastomeric block comprising at least units derived from isobutylene, and having a glass transition temperature of less than or equal to −20° C., b) one or more thermoplastic blocks, the thermoplastic block(s) each comprising at least one first block consisting of units derived from at least one polymerizable monomer and at least one second block, said second block(s) being a random copolymer consisting of units derived from α-methylstyrene and of units derived from β-pinene.

In the present invention, the glass transition temperature (denoted Tg) may be measured by the DMA (dynamic mechanical analysis) method, consisting in establishing the curve of the change in elastic modulus G' as a function of temperature. According to this method, the glass transition temperature corresponds to the temperature at which the intersection between the straight line tangent to the glassy plateau and the straight line tangent to the zone of transition between the glassy plateau and the rubbery plateau is observed, during the temperature sweep.

Thus, in the present description, unless expressly indicated otherwise, the glass transition temperature is defined as the temperature at which the intersection between the straight line tangent to the glassy plateau and the straight line tangent to the zone of transition between the glassy plateau and the rubbery plateau of the change in the elastic modulus G' is observed, during the temperature sweep of a cross-linked sample (size of the sample length: 6 mm, width: 5 mm, thickness: 2 mm) subjected to a sinusoidal stress (frequency of 10 Hz). As indicated above, this Tg value is measured during the measurement of the dynamic properties on a viscosity analyser (DVA 200—IT Instrumental Control), according to standard JIS K 6384 (Testing Methods for Dynamic Properties of Vulcanized Rubber and Thermoplastic Rubber).

According to a first variant of the invention, the block copolymer has a structure in which the elastomeric block is connected at one of its ends to a thermoplastic block.

In a particular embodiment of this first variant, the block copolymer has a triblock structure with an isobutylene block (elastomeric block), a block consisting of units derived from at least one polymerizable monomer, and a block consisting of a random copolymer of units derived from α-methylstyrene and of units derived from β-pinene.

In a first particular sub-embodiment of this first variant, the block copolymer has a triblock structure in the following order: isobutylene block/(α-methylstyrene-co-β-pinene) block/block consisting of units derived from at least one polymerizable monomer.

In a second particular sub-embodiment of this first variant, the block copolymer has a triblock structure in the following order: isobutylene block/block consisting of units derived from at least one polymerizable monomer/(α-methylstyrene-co-β-pinene) block.

The indicator "-co-" means that the two species being on either side of this indicator constitutes a random copolymer.

According to a second variant of the invention, the block copolymer has a linear structure in which the elastomeric block is connected at each of its ends to a thermoplastic block.

In a particular embodiment of this second variant, the block copolymer has a five-block structure with a central isobutylene block (elastomeric block), and at each end of the isobutylene block a block consisting of units derived from at least one first polymerizable monomer, and a block consisting of a random copolymer of units derived from α-methylstyrene and of units derived from β-pinene.

In a first particular sub-embodiment of this second variant, the block copolymer has a five-block structure in the following order: block consisting of units derived from at least one polymerizable monomer/(α-methylstyrene-co-β-pinene) block/isobutylene block/(α-methylstyrene-co-β-pinene) block/block consisting of units derived from at least one polymerizable monomer.

In a second particular sub-embodiment of this second variant, the block copolymer has a five-block structure in the following order: (α-methylstyrene-co-β-pinene) block/ block consisting of units derived from at least one polymerizable monomer/isobutylene block/block consisting of units derived from at least one polymerizable monomer/(α-methylstyrene-co-β-pinene) block.

According to a third variant of the invention, the block copolymer has a star-branched structure, the elastomeric block being central and being connected to 3 to 12 branches, each branch consisting of a thermoplastic block. The number of branches of the block copolymer preferably ranges from 3 to 6.

According to another variant of the invention, the block copolymer is in a branched or dendrimer form. The block copolymer is then composed of a branched or dendrimeric elastomer and of a thermoplastic block, located at each of the ends of the branches of the branched or dendrimeric elastomer.

The block copolymer preferably has a glass transition temperature (Tg, measured by the DMA method) of less than −20° C., more preferentially less than −40° C., and even more preferentially less than −50° C. A Tg value above these minima may reduce the performance qualities of the gastight layer during use at very low temperature.

Preferably, the block copolymer that can be used according to the invention has a weight-average molecular weight ranging from 30 to 300 kg/mol, preferably from 120 to 250 kg/mol.

Below the indicated minimum, the cohesion between the chains of the elastomer could be adversely affected. Moreover, in this case, an increase in the operating temperature could adversely affect the mechanical properties, especially the properties at break, with the consequence of a reduced performance "under hot conditions".

Moreover, too high a molecular weight may be detrimental to the use of the gastight layer, this possibly proving difficult, or even impossible, to use.

The weight-average molecular weights (Mw) and number-average molecular weights (Mn) of the block copolymer which can be used according to the invention may be determined, in a manner known per se, by GPC (gel permeation chromatography).

The GPC unit comprises four modules: Waters 717 plus autosampler, Waters 515 HPLC pump, Waters 2487 and Waters 2414. A 0.05 ml sample of solution is injected and passes through the columns (Shodex® GPC K-804 and Shodex® GPC K-802.5) by virtue of an eluent (chloroform) at a flow rate of 1.0 ml/min at 35° C.

The block copolymer which can be used in the gastight elastomer layer of the pneumatic object according to the invention generally has a polydispersity index (PDI=Mw/Mn) of less than or equal to 3, more preferentially less than or equal to 2, and even more preferentially of less than or equal to 1.5.

As a reminder, the block copolymer which can be used in the gastight elastomer layer of the pneumatic object according to the invention comprises an elastomeric block and one or more thermoplastic blocks.

The elastomeric block of this block copolymer comprises at least some units derived from isobutylene, and has a glass transition temperature of less than or equal to −20° C. (Tg, measured by the DMA method).

The elastomeric block preferably has a glass transition temperature of less than or equal to −40° C., preferably less than or equal to −50° C.

In a preferred variant of the invention, the elastomeric block also comprises from 0.5 to 6% by weight, preferably from 1.5 to 5% by weight, relative to the total weight of the elastomeric block, of units derived from one or more conjugated dienes.

The conjugated dienes which can be copolymerized with the isobutylene to form the elastomeric block are $C_4$-$C_{14}$ conjugated dienes. Preferably, these conjugated dienes are selected from isoprene, 1,3-butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, β-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and their mixture.

More preferentially, the conjugated diene is isoprene or a mixture containing isoprene.

The elastomeric block is advantageously halogenated.

This halogenation makes it possible to increase the curing rate of the elastomer layer comprising the block copolymer. This halogenation makes it possible to improve the compatibility of the block copolymer with the other elements constituting the elastomer layer which is gastight to inflation gases. The halogenation is carried out especially using bromine or chlorine, preferentially bromine, on the units derived from conjugated dienes of the polymer chain of the elastomeric block. Only a portion of these units reacts with the halogen. This reactive portion of units derived from conjugated dienes must nonetheless be such that the content of units derived from conjugated dienes which has not reacted with the halogen is at least 0.5% by weight relative to the weight of the elastomeric block.

As explained above, the block copolymer which can be used in the gastight elastomer layer of the pneumatic object according to the invention also comprises one or more thermoplastic blocks.

The thermoplastic block(s) of this block copolymer each comprise at least one first block consisting of units derived from at least one polymerizable monomer and at least one second block, the second block being a random copolymer consisting of units derived from α-methylstyrene and of units derived from β-pinene.

The polymerizable monomer(s) is (are) preferably selected from styrene monomers.

In the present description, the term "styrene monomer" is intended to mean any monomer based on styrene, which is either unsubstituted or substituted.

Mention may especially be made of the following monomers: styrene, methylstyrenes and especially o-methylstyrene, m-methylstyrene, p-methylstyrene, α-methylstyrene, α,2-dimethylstyrene, α,4-dimethylstyrene and diphenyl ethylene; butylstyrenes, for example para-(tert-butyl)styrene; chlorostyrenes, for example, o-chlorostyrene, m-chlorostyrene, p-chlorostyrene, 2,4-dichlorostyrene, 2,6-dichlorostyrene or 2,4,6-trichlorostyrene; bromostyrenes, for example, o-bromostyrene, m-bromostyrene, p-bromostyrene, 2,4-dibromostyrene, 2,6-dibromostyrene or 2,4,6-tribromostyrene; fluorostyrenes, for example, o-fluorostyrene, m-fluorostyrene, p-fluorostyrene, 2,4-difluorostyrene, 2,6-difluorostyrene or 2,4,6-trifluorostyrene, and para-hydroxystyrene.

The polymerizable monomer(s) which can be used according to the invention are preferably selected from styrene, α-methylstyrene, diphenyl ethylene, p-methylstyrene, p-(tert-butyl)styrene, p-chlorostyrene and p-fluorostyrene.

The polymerizable monomer(s) may also be selected from indene monomers.

In the present description, the term "indene monomer" is intended to mean any monomer based on indene, which is either unsubstituted or substituted. Among the substituted indenes, mention may be made for example of alkylindenes and arylindenes.

As polymerizable monomers, mention may also be made of the following compounds and mixtures thereof:

acenaphthylene: those skilled in the art may refer, for example, to the paper by Z. Fodor, J. P. Kennedy, Polymer Bulletin, 1992, 29(6), 697-705;

isoprene, then resulting in the formation of a certain number of trans-1,4-polyisoprene units and of units cyclized according to an intramolecular process; those skilled in the art may, for example, refer to the documents G. Kaszas, J. E. Puskas, P. Kennedy Applied Polymer Science (1990) 39(1) 119-144 and J. E. Puskas, G. Kaszas, J. P. Kennedy, Macromolecular Science, Chemistry A28 (1991), 65-80;

esters of acrylic acid, crotonic acid, sorbic acid, methacrylic acid, acrylamide derivatives, methacrylamide derivatives, acrylonitrile derivatives, methacrylonitrile derivatives and mixtures thereof; mention may more particularly be made of adamantyl acrylate, adamantyl crotonate, adamantyl sorbate, 4-biphenylyl acrylate, tert-butyl acrylate, cyanomethyl acrylate, 2-cyanoethyl acrylate, 2-cyanobutyl acrylate, 2-cyanohexyl acrylate, 2-cyanoheptyl acrylate, 3,5-dimethyladamantyl acrylate, 3,5-dimethyladamantyl crotonate, isobornyl acrylate, pentachlorobenzyl acrylate, pentafluorobenzyl acrylate, pentachlorophenyl acrylate, pentafluorophenyl acrylate, adamantyl methacrylate, 4-(tert-butyl)cyclohexyl methacrylate, tert-butyl methacrylate, 4-(tert-butyl)phenyl methacrylate, 4-cyanophenyl methacrylate, 4-cyanomethylphenyl methacrylate, cyclohexyl methacrylate, 3,5-dimethyladamantyl methacrylate, dimethylaminoethyl methacrylate, 3,3-dimethylbutyl methacrylate, methacrylic acid, methyl methacrylate, ethyl methacrylate, phenyl methacrylate, isobornyl methacrylate, tetradecyl methacrylate, trimethylsilyl methacrylate, 2,3-xylenyl methacrylate, 2,6-xylenyl methacrylate, acrylamide, N-(sec-butyl)acrylamide, N-(tert-butyl)acrylamide, N,N-diisopropylacrylamide, N-(1-methylbutyl)acrylamide, N-methyl-N-phenylacrylamide, morpholylacrylamide, piperidylacrylamide, N-(tert-butyl)methacrylamide, 4-butoxycarbonylphenylmethacrylamide, 4-carboxyphenylmethacrylamide, 4-methoxycarbonylphenylmethacrylamide, 4-ethoxycarbonylphenylmethacrylamide, butyl cyanoacrylate, methyl chloroacrylate, ethyl chloroacrylate, isopropyl chloroacrylate, isobutyl chloroacrylate, cyclohexyl chloroacrylate, methylfluoromethacrylate, methyl phenylacrylate, acrylonitrile, methacrylonitrile and mixtures thereof.

Particularly preferably, the polymerizable monomer is styrene.

In the block copolymer which can be used according to the invention, the polymerizable monomer is particularly preferably not a β-pinene.

As explained above, the thermoplastic block(s) of this block copolymer each comprise at least one first block consisting of units derived from at least one polymerizable monomer and at least one second block, said second block(s) being a random copolymer consisting of units derived from α-methylstyrene and of units derived from β-pinene.

The content of said units derived from β-pinene preferably ranges from 0.5 to 25 mol %, preferably from 0.8 to 5 mol % relative to the number of moles of units of the block copolymer.

For a β-pinene content of greater than 25%, the heat resistance of the layer which is gastight to inflation gases could be degraded. On the other hand, for a β-pinene content of less than 0.5%, the beneficial effect of the presence of β-pinene in the layer which is gastight to inflation gases on adhesion could be virtually imperceptible.

The thermoplastic block(s) generally represent from 5 to 30% by weight, preferably from 10 to 20% by weight, relative to the total weight of the block copolymer.

The block copolymer which can be used according to the invention gives the composition gastight to inflation gases which contains it a large capacity for adhesion to the rubber components of the pneumatic object, especially pneumatic tyre, which are adjacent to it.

In addition, this block copolymer, despite its thermoplastic nature, gives the gastight composition which contains it a good hot cohesion of the material, especially at temperatures ranging from 150 to 200° C. These temperatures correspond to the temperatures for curing pneumatic tyres. This high-temperature cohesion enables these tyres to be demoulded under hot conditions without adversely affecting the integrity of the gastight composition containing the particular block copolymer.

Therefore, the block copolymer which can be used according to the invention surprisingly makes it possible to reach a compromise between the often contradictory properties of hot cohesion of the composition that contains it and of adhesion of this composition to the rubber components which are adjacent to it in the pneumatic object. This compromise of properties is achieved while retaining the properties of gastightness and the processability of the composition comprising this block copolymer, and also while imparting improved hysteresis properties (compared to butyl rubber) as an inner rubber for a pneumatic tyre.

The block copolymer which can be used in the gastight elastomer layer of the pneumatic object according to the invention may be prepared by synthesis processes known per se and described in the literature, especially that cited in the presentation of the prior art of the present description. Those skilled in the art will know how to choose the appropriate polymerization conditions and to adjust the various parameters of the polymerization processes in order to result in the specific structural characteristics of the block copolymer which can be used according to the invention.

Several synthesis strategies can be especially employed for the purpose of preparing the block copolymer which can be used according to the invention.

A first strategy consists of a first step of synthesizing the elastomeric block by living cationic polymerization of the monomers to be polymerized by means of a monofunctional, bifunctional or polyfunctional initiator known to those skilled in the art, followed by the second step of synthesizing the thermoplastic block(s) by polymerization, either of at least one polymerizable monomer or of a mixture of an α-methylstyrene monomer and of a monomer of β-pinene, on the living elastomeric block obtained in the first step, then of a third step of synthesizing the thermoplastic block(s) by polymerization, respectively, either of a mixture of an α-methylstyrene monomer and of a monomer of β-pinene, or of at least one polymerizable monomer, on the living block resulting from the second step.

Thus, these three steps are consecutive, which is reflected by the sequenced addition:

of the monomers to be polymerized for the preparation of the elastomeric block: isobutylene alone or in a mixture with one or more conjugated diene monomers;

of one or more polymerizable monomers or of the mixture of α-methylstyrene and of β-pinene, of the mixture of α-methylstyrene and of β-pinene or of one or more polymerizable monomers.

At each step, the monomer(s) to be polymerized may or may not be added in the form of a solution in a solvent as is described below, in the presence or absence of a Lewis acid or base as are described below.

Each of these steps can be carried out in the same reactor or in two different polymerization reactors. Preferentially, these two steps are carried out in a single reactor (one-pot synthesis).

The living cationic polymerization is carried out conventionally by means of an initiator and optionally of a Lewis acid acting as coinitiator in order to form a carbocation in situ. Usually, electron-donating compounds are added in order to confer a living nature on the polymerization.

By way of illustration, the monofunctional, bifunctional or polyfunctional initiators which can be used for the preparation of the block copolymer which can be used according to the invention may be selected from (2-methoxy-2-propyl)benzene (cumylmethyl ether), (2-chloro-2-propyl)benzene (cumyl chloride), (2-hydroxy-2-propyl)benzene, (2-acetoxy-2-propyl)benzene, 1,4-di(2-methoxy-2-propyl)benzene (or dicumylmethyl ether), 1,3,5-tri(2-methoxy-2-propyl)benzene (or tricumylmethyl ether), 1,4-di(2-chloro-2-propyl)benzene (or dicumyl chloride), 1,3,5-tri(2-chloro-2-propyl)benzene (or tricumyl chloride), 1,4-di(2-hydroxy-2-propyl)benzene, 1,3,5-tri(2-hydroxy-2-propyl)benzene, 1,4-di(2-acetoxy-2-propyl)benzene, 1,3,5-tri(2-acetoxy-2-propyl)benzene, 2,6-dichloro-2,4,4,6-tetramethylheptane and 2,6-dihydroxy-2,4,4,6-heptane.

Preferentially, dicumyl ethers, tricumyl ethers, dicumyl halides or tricumyl halides are used.

The Lewis acids may be selected from metal halides of general formula $MX_n$, where M is an element selected from Ti, Zr, Al, Sn, P or B, X is a halogen, such as Cl, Br, F or I, and n corresponds to the degree of oxidation of the element M. Mention will be made, for example, of $TiCl_4$, $AlCl_3$, $BCl_3$, $BF_3$, $SnCl_4$, $PCl_3$ or $PCl_5$. The compounds $TiCl_4$, $AlCl_3$ and $BCl_3$ are preferentially used and more preferentially still $TiCl_4$.

The electron-donating compounds may be selected from known Lewis bases, such as pyridines, amines, amides, esters, sulphoxides and others. Preference is given, among these, to DMSO (dimethyl sulphoxide) and DMAc (dimethylacetamide).

The living cationic polymerization is carried out in an inert nonpolar solvent or in a mixture of inert nonpolar and polar solvents.

The nonpolar solvents which can be used for the synthesis of the block copolymer which can be used in the invention are, for example, aliphatic, cycloaliphatic or aromatic hydrocarbon solvents, such as hexane, heptane, cyclohexane, methylcyclohexane, benzene or toluene.

The polar solvents which can be used for the synthesis of the block copolymer which can be used in the invention are, for example, halogenated solvents, such as alkyl halides, for example methyl chloride (or chloroform), ethyl chloride, butyl chloride, methylene chloride (or dichloromethane) or chlorobenzenes (mono-, di- or trichloro).

Those skilled in the art will know how to choose appropriate temperature conditions for the purpose of achieving the characteristics of molecular weights of this polymer.

A second synthesis strategy consists in separately preparing:

an elastomeric block which is telechelic or functional at one or more of its chain ends by living cationic polymerization by means of a monofunctional, bifunctional or polyfunctional initiator, optionally followed by a functionalization reaction on the chain ends, the living thermoplastic block(s), for example by anionic polymerization, and in then reacting both of them in order to obtain a block copolymer which can be used according to the invention. The nature of the reactive functions at each of the chain ends of the elastomeric block and the proportion of living thermoplastic blocks relative to the elastomeric block will be chosen by those skilled in the art in order to obtain a block copolymer which can be used according to the invention.

The optional halogenation of the block copolymer which can be used according to the invention obtained according to either one of the synthesis strategies is carried out according to any method known to those skilled in the art, especially those used for the halogenation of butyl rubber, and can be carried out, for example, by means of bromine or chlorine, preferentially bromine, on the units derived from conjugated dienes of the polymer chain of the elastomeric block, when they are present, or on the units derived from β-pinene.

In some variants of the invention according to which the block copolymer is star-branched or else branched, the processes described, for example, in the papers by Puskas, J. Polym. Sci. Part A: Polymer Chemistry, Vol. 36, pp 85-82 (1998), and Puskas, J. Polym. Sci. Part A: Polymer Chemistry, Vol. 43, pp 1811-1826 (2005), can be analogously employed in order to obtain living star-branched, branched or dendrimeric central elastomeric blocks. Those skilled in the art will then know how to choose the composition of the mixtures of monomers to be used for the purpose of preparing the block copolymer which can be used according to the invention and also the appropriate temperature conditions for the purpose of achieving the characteristics of molecular weights of this copolymer.

The block copolymer which can be used according to the invention will preferentially be prepared by living cationic polymerization by means of a monofunctional, bifunctional or polyfunctional initiator and by addition of the monomers to be polymerized for the synthesis of the elastomeric block, then by sequenced addition, for the first block, and by consecutive addition, for the second block, of the monomers to be polymerized for the synthesis of the thermoplastic block(s).

The present invention is not restricted to a specific polymerization process starting from such a mixture of monomers. This type of process is well known to those skilled in the art. Thus, syntheses described in the prior art, especially in the patent documents EP 731 112, U.S. Pat. Nos. 4,946,899, 5,260,383, can be carried out analogously for preparing the block copolymer which can be used according to the invention.

The block copolymer may alone constitute the gastight elastomer layer or else be combined, in this elastomer layer, with other constituents in order to form an elastomer composition.

In particular, the block copolymer which can be used according to the invention may be in a mixture with another block copolymer which can be used according to the invention of another type.

For example, a first block copolymer according to the invention may be in the form of a linear triblock with an isobutylene block (elastomeric block), a block consisting of units derived from at least one polymerizable monomer, and a block consisting of a random copolymer of units derived from α-methylstyrene and of units derived from β-pinene. A second block copolymer according to the invention may be in the form of a five-block polymer with a central isobutylene block (elastomeric block), and, at each end of the isobutylene block, a block consisting of units derived from at least one polymerizable monomer, and a block consisting of a random copolymer of units derived from α-methylstyrene and of units derived from β-pinene. These two block copolymers which can be used according to the invention in a mixture may then form a gastight elastomer layer used according to the invention.

If optional other elastomers are used in this composition, the block copolymer(s) which can be used according to the invention constitute the predominant elastomer(s) by weight; they then represent more than 50%, more preferentially more than 70% by weight of all the elastomers. Such minority supplemental elastomers could for example be diene elastomers such as natural rubber or a synthetic polyisoprene, a butyl rubber or thermoplastic styrene (TPS) elastomers other than the block copolymer(s) which can be used according to the invention, as long as their microstructures are compatible.

Mention may especially be made, as TPS elastomer other than the block copolymer(s) which can be used according to the invention, of a TPS elastomer selected from the group consisting of styrene/butadiene/styrene block copolymers, styrene/isoprene/styrene block copolymers, styrene/isoprene/butadiene/styrene block copolymers, styrene/ethylene/butylene/styrene block copolymers, styrene/ethylene/propylene/styrene block copolymers, styrene/ethylene/ethylene/propylene/styrene block copolymers, and the mixtures of these copolymers. More preferentially, said optional supplemental TPS elastomer is selected from the group consisting of styrene/ethylene/butylene/styrene block copolymers, styrene/ethylene/propylene/styrene block copolymers, and the mixtures of these copolymers.

Nonetheless, according to a preferential embodiment, the block copolymer(s) which can be used according to the invention are the only elastomers present in the gastight elastomer layer.

The elastomer layer gastight to inflation gas particularly preferably only comprises a single block copolymer which can be used according to the invention, which is the only elastomer present in the gastight elastomer layer.

The block copolymer described above is sufficient alone to fulfil the role of gastightness with regard to the pneumatic objects in which it is used.

Nonetheless, according to a preferential embodiment of the invention, the latter is used in a composition which also comprises, as plasticizing agent, an extending oil (or plasticizing oil), the function of which is to facilitate the processing, particularly the incorporation into the pneumatic object by a lowering of the modulus and an increase in the tackifying power of the gastight layer.

Thus, in this preferential embodiment of the invention, the elastomer layer which is gastight to inflation gases also comprises an extending oil.

As extending oil, use may be made of any extending oil, preferably having a weakly polar nature, capable of extending or plasticizing elastomers, especially thermoplastic elastomers. At ambient temperature (23° C.), these oils, which are more or less viscous, are liquids (that is to say, as a reminder, substances which have the ability to eventually assume the shape of their container), in contrast especially to resins or rubbers, which are by nature solid.

Preferably, the extending oil is selected from the group consisting of polyolefinic oils (that is to say, resulting from the polymerization of monoolefinic or diolefinic olefins), paraffinic oils, naphthenic oils (of low or high viscosity), aromatic oils, mineral oils and the mixtures of these oils.

More preferentially, the extending oil is selected from olefinic oils, and is preferably a polyisobutylene (abbreviated to PIB) oil. This is because this oil has demonstrated the best compromise of properties, compared to other oils tested, especially to a conventional paraffinic-type oil.

By way of examples, polyisobutylene oils are sold especially by Univar under the name Dynapak Poly (for example Dynapak Poly 190), by INEOS Oligomer under the name INDOPOL H1200 and by BASF under the names Glissopal (for example Glissopal 1000) or Oppanol (for example Oppanol B12); paraffinic oils are sold, for example, by Exxon under the name Telura 618 or by Repsol under the name Extensol 51.

The extending oil preferably has a number-average molar mass ranging from 350 to 4000 g/mol, more preferentially ranging from 400 to 3000 g/mol.

The number-average molecular weight (Mn) of the extending oil, when it is present, may be determined by size exclusion chromatography (SEC), the sample of oil is dissolved beforehand in tetrahydrofuran at a concentration of approximately 1 g/l; the solution is then filtered through a filter with a porosity of 0.45 μm before injection. The apparatus used is a Waters Alliance chromatographic line. The elution solvent is tetrahydrofuran, the flow rate is 1 ml/min, the temperature of the system is 35° C. and the analysis time is 30 min. A set of two Waters columns with the Styragel HT6E name is used. The injected volume of the solution of the oil sample is 100 μl. The detector is a Waters 2410 differential refractometer and its associated software, for making use of the chromatographic data, is the Waters Millennium system. The calculated average molar masses are relative to a calibration curve produced with polystyrene standards.

Indeed, it has been shown that for excessively low number-average molecular weights, there is a risk of the oil migrating outside the composition, whereas excessively high weights can result in excessive stiffening of this composition. This choice has proved to constitute an excellent compromise for the targeted applications, in particular for use in a pneumatic tyre.

The extending oil is preferably present at a content of greater than 5 phr, preferably of between 5 and 100 phr (parts by weight per hundred parts of total elastomer, that is to say the block copolymer which can be used according to the invention and also any other optional elastomer present in the elastomer layer or composition).

Below the minimum indicated, there is a risk of the elastomer composition exhibiting a stiffness which is too great for some applications, whereas, above the recommended maximum, the risk arises of an insufficient cohesion of the composition and of loss of gastightness which may be harmful depending on the application under consideration.

For these reasons, in particular for use of the gastight composition in a pneumatic tyre, it is preferable for the content of extending oil to be greater than 10 phr, especially of between 10 and 90 phr, more preferentially still for it to be greater than 20 phr, especially of between 20 and 80 phr.

The elastomer layer which is gastight to inflation gases described above may furthermore comprise the various additives normally present in the elastomer layers which are gastight to inflation gases known to those skilled in the art.

Mention may be made, for example, of reinforcing fillers.

Use may be made of any type of reinforcing filler known for its abilities to reinforce a rubber composition which can be used for the manufacture of tyres, for example carbon black, a reinforcing inorganic filler, such as silica, or else a blend of these two types of filler, especially a blend of carbon black and silica.

All carbon blacks, used individually or in the form of mixtures, especially blacks of the HAF, ISAF or SAF type, conventionally used in tyres ("tyre-grade" blacks) are suitable as carbon blacks. Use may also be made, according to the applications targeted, of blacks of higher series FF, FEF, GPF or SRF. The carbon blacks could, for example, be already incorporated in the diene elastomer in the form of a masterbatch, before or after grafting and preferably after grafting (see, for example, applications WO 97/36724 or WO 99/16600).

Reinforcing inorganic filler other than carbon black should be understood, in the present application, by definition, as meaning any inorganic or mineral filler as opposed to carbon black, capable of reinforcing by itself alone, without means other than an intermediate coupling agent, a rubber composition intended for the manufacture of tyres; such a filler is generally characterized, in a known way, by the presence of hydroxyl (—OH) groups at its surface.

The physical state in which the reinforcing filler is provided is not important, whether it is in the form of a powder, of microbeads, of granules, of beads or any other appropriate densified form. Of course, reinforcing filler is also understood to mean mixtures of different reinforcing fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers other than carbon black.

Preferably, the content of reinforcing filler in the gastight elastomer composition varies from 10 to 200 phr, more preferentially from 30 to 150 phr, in particular from 50 to 120 phr, the optimum being, in a way known per se, different according to the specific applications targeted.

According to one embodiment, the reinforcing filler predominantly comprises silica, the content of carbon black present in the gastight elastomer layer being preferably less than 20 phr, more preferentially less than 10 phr (for example between 0.5 and 20 phr, especially from 1 to 10 phr).

The reinforcing filler preferably predominantly comprises carbon black, or even consists solely of carbon black.

When the reinforcing filler comprises a filler requiring the use of a coupling agent in order to establish the bond between the filler and the elastomer, the gastight elastomer layer also conventionally comprises an agent capable of effectively providing this bond. When silica is present in the gastight elastomer layer as reinforcing filler, use is made, in a known manner, of an at least bifunctional coupling agent (or bonding agent) intended to provide a sufficient connection, of chemical and/or physical nature, between the inorganic filler (surface of its particles) and the thermoplastic elastomer, in particular bifunctional organosilanes or polyorganosiloxanes.

In the gastight elastomer layer which can be used according to the invention, the content of coupling agent preferentially varies from 0.5 to 12 phr, it being understood that it is in general desirable to use as little as possible of it. The presence of the coupling agent depends on the presence of the reinforcing inorganic filler other than carbon black. Its content is easily adjusted by those skilled in the art according to the content of this filler; it is typically of the order of 0.5% to 15% by weight, with respect to the amount of reinforcing inorganic filler other than carbon black.

Those skilled in the art will understand that, as filler equivalent to the reinforcing inorganic filler other than carbon black, a reinforcing filler of another nature might be used, provided that this reinforcing filler is covered with an inorganic layer, such as silica, or else comprises functional sites, especially hydroxyl sites, at its surface requiring the use of a coupling agent in order to form the bond between the filler and the thermoplastic elastomer.

The gastight elastomer layer which can be used according to the invention can also contain reinforcing organic fillers which can replace all or a portion of the carbon blacks or of the other reinforcing inorganic fillers described above. Mention may be made, as examples of reinforcing organic fillers, of functionalized polyvinyl organic fillers, such as described in applications WO-A-2006/069792, WO-A-2006/069793, WO-A-2008/003434 and WO-A-2008/003435.

As other additives customarily present in the elastomer layers known to those skilled in the art which are gastight to inflation gases, mention will be made, for example, of non-reinforcing or inert fillers, colouring agents which can advantageously be used for the colouring of the composition, platy fillers which further improve the gastightness (for example phyllosilicates such as kaolin, talc, mica, graphite, clays or organo clays), plasticizers other than the above-mentioned extending oils, protective agents, such as antioxidants or antiozonants, UV stabilizers, various processing aids or other stabilizers, or else promoters able to promote adhesion to the rest of the structure of the pneumatic object.

The gastight elastomer layer described above is a solid (at 23° C.) and elastic compound, which is especially characterized, by virtue of its specific formulation, by a very high flexibility and very high deformability.

According to a preferential embodiment of the invention, this gastight elastomer layer has a secant tensile modulus, at 10% elongation (denoted M10), which is less than 2 MPa, more preferentially less than 1.5 MPa (especially less than 1 MPa). This magnitude is measured in first elongation (that is to say without an accommodation cycle) at a temperature of 23° C., with a pull speed of 500 mm/min (standard ASTM D412), and related to the initial cross section of the test specimen.

The gastight elastomer layer described above can be used as a gastight layer in any type of pneumatic object. Examples of such pneumatic objects that may be mentioned include pneumatic boats, and balls used for games or sport.

It is particularly well suited to use as an airtight layer (or layer which is gastight to any other inflation gas, for example nitrogen) in a pneumatic object or finished or semi-finished product made of rubber, most particularly in a pneumatic tyre for a motor vehicle such as a two-wheeled vehicle, passenger vehicle or industrial vehicle.

Such an airtight layer is preferentially arranged on the inner wall of the pneumatic object, but it may also be entirely incorporated in its internal structure.

The gastight layer preferentially has a thickness of greater than or equal to 0.05 mm, preferably ranging from 0.1 to 10 mm, and more preferentially ranging from 0.1 to 2 mm.

It will be easily understood that, according to the specific fields of application, the dimensions and the pressures involved, the embodiment of the invention can vary, the gastight elastomer layer then comprising several preferential ranges of thickness.

Thus, for example, for pneumatic tyres of passenger vehicle type, they can have a thickness of at least 0.4 mm, preferentially of between 0.8 and 2 mm. According to another example, for pneumatic tyres of heavy-duty or agricultural vehicles, the preferential thickness can be between 1 and 3 mm. According to another example, for pneumatic tyres of vehicles in the field of civil engineering or for aeroplanes, the preferential thickness can be between 2 and 10 mm.

The pneumatic object according to the invention is preferably a pneumatic tyre.

In general, the pneumatic object according to the invention is intended to equip motor vehicles of passenger type, SUVs (sport utility vehicles), two-wheeled vehicles (especially motorbikes), aeroplanes, and also industrial vehicles such as vans, heavy-duty vehicles and other transportation or material-handling vehicles.

Heavy duty vehicles may especially comprise underground trains, buses and heavy road transport vehicles such as lorries, tractors, trailers and off-road vehicles, such as agricultural or civil engineering vehicles.

The invention also relates to a process for rendering a pneumatic object gastight to inflation gases, in which an elastomer layer which is gastight to inflation gases, as defined above, is incorporated into said pneumatic object during the manufacture thereof, or added to said pneumatic object after the manufacture thereof.

In this process for rendering gastight, the elastomer layer which is gastight to inflation gases is preferably arranged on the inner wall of the pneumatic object.

In a particular variant of this process, the pneumatic object is a pneumatic tyre.

In this particular variant, during a first step, the elastomer layer which is gastight to inflation gases is deposited flat on a tyre-building drum, before covering said elastomer layer which is gastight to inflation gases with the rest of the structure of the pneumatic tyre.

Finally, the invention relates to the use, as layer which is gastight to inflation gases, in a pneumatic object, of an elastomer layer as defined above.

The invention and also its advantages will be more thoroughly understood in the light of the single FIGURE, which diagrammatically represents, in radial cross section, a pneumatic tyre in accordance with the invention, and also the exemplary embodiments which follow.

The single appended FIGURE represents very diagrammatically (without observing a specific scale) a radial cross section of a pneumatic tyre in accordance with the invention.

This pneumatic tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic FIGURE. A carcass reinforcement 7 is wound around the two bead wires 5 in each bead 4, the turn-up 8 of this reinforcement 7 being, for example, positioned towards the outside of the tyre 1, which is represented fitted to its wheel rim 9. The carcass reinforcement 7, in a way known per se, consists of at least one ply reinforced by "radial" cords, for example textile or metal cords, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

The inner wall of the tyre 1 comprises an airtight layer 10, for example with a thickness equal to approximately 0.9 mm, on the side of the internal cavity 11 of the pneumatic tyre 1.

This inner layer (or "inner liner") covers the entire inner wall of the pneumatic tyre, extending from one sidewall to the other, at least as far as the level of the rim flange when the pneumatic tyre is in the fitted position. It defines the radially internal face of said tyre intended to protect the carcass reinforcement from the diffusion of air originating in the inner space 11 of the tyre. It makes it possible to inflate the pneumatic tyre and to keep it under pressure; its gastightness properties allow it to guarantee a relatively low level of pressure loss and to keep the tyre inflated in a normal operating state for a sufficient period of time, normally of several weeks or several months.

Unlike a conventional pneumatic tyre using a composition based on butyl rubber, in this example, the pneumatic tyre in accordance with the invention uses a thermoplastic elastomer in the form of a block copolymer as described above as layer 10 which is gastight to inflation gases.

The tyre provided with its airtight layer 10 as described above can be produced before or after vulcanization (or curing).

Measuring Methods

1) Gastightness Test

For this analysis, use was made of a rigid-wall permeameter, placed in an oven (temperature at 60° C. in the present case), equipped with a relative pressure sensor (calibrated in the range from 0 to 6 bar) and connected to a tube equipped with an inflation valve. The permeameter can receive standard test specimens in disc form (for example, with a diameter of 65 mm in the present case) and with a uniform thickness which can range up to 1.5 mm (0.5 mm in the present case). The pressure sensor is connected to a National Instruments data acquisition card (0-10 V analogue four-channel acquisition) which is connected to a computer performing continuous acquisition with a frequency of 0.5 Hz (1 point every two seconds). The permeability coefficient (K) is measured from the linear regression line giving the slope a of the loss of pressure through the tested test specimen as a function of the time, after stabilization of the system, that is to say the achievement of stable conditions under which the pressure decreases linearly as a function of the time. An arbitrary value of 100 is given for the airtightness of the control, a result greater than 100 indicating an increase in the airtightness and thus a decrease in the permeability.

2) Adhesion (or Peel) Test: Elastomer Layer which is Gastight to Inflation Gases/Layer Based on a Diene Elastomer Adhesion tests (peel tests) were performed to test the capacity of the gastight elastomer layer to adhere after curing to a diene elastomer layer, more precisely to a usual rubber composition for carcass reinforcement of a pneumatic tyre, based on natural rubber (peptized) and carbon black N330 (65 parts by weight per hundred parts of natural rubber), also comprising the usual additives (sulphur, accelerator, ZnO, stearic acid, antioxidant).

The peeling test specimens (for 180°-type peeling) were prepared by stacking a thin layer of gastight composition between two calendered fabrics; the first with a SIBS elastomer (1.5 mm) and the other with the diene mixture under consideration (1.2 mm). An incipient failure is inserted between the two calendered fabrics at the end of the thin layer.

The test specimen after assembly was vulcanized at 180° C. under pressure for 10 minutes. Strips with a width of 30 mm were cut out using a cutting machine. The two sides of the incipient failure were subsequently placed in the jaws of an Instron® brand tensile testing machine. The tests are performed at room temperature and at a pull speed of 100 mm/min. The tensile stresses are recorded and the latter are standardized by the width of the test specimen. A curve of strength per unit width (in N/mm) as a function of the movable crosshead displacement of the tensile testing machine (between 0 and 200 mm) is obtained. The adhesion value selected corresponds to the initiation of failure in the specimen and thus to the maximum value of this curve.

An arbitrary value of 100 is given for the adhesion of the control, a result greater than 100 indicating an increase in the adhesion.

3) Test of Heat Resistance (or Test for Determining a Softening Point)

In order to characterize the softening point of an elastomer composition, the following test is used:

Apparatus: dynamic mechanical analyser (DMA Q800) sold by TA Instruments;

Sample: of cylindrical shape, it is produced using a hollow punch and measures on average 13 mm in diameter for a thickness of 2 mm;

Stress: the sample holder is in the form of a compressive jaw; this part consists of a movable upper plate (15 mm in diameter) and of a fixed lower plate (15 mm in diameter); the sample is placed between these two plates; the movable part makes it possible to apply a defined stress to the sample of 1 N; the setup is placed in an oven which makes it possible to produce a temperature gradient from ambient temperature to 180° C. at 3° C./min, during which the strain of the sample is recorded;

Interpretation: the results are provided in the form of a curve for strain of the sample as a function of the temperature; the softening point is regarded to be that for which the material has a reduction in its thickness of 10%.

An arbitrary value of 100 is given for the heat resistance of the control, a result greater than 100 indicating an increase in the heat resistance.

Example 1: Preparation of a Reference Block Copolymer (Polymer 1)—Styrene/Isobutylene/Styrene Block Copolymer The block copolymer (polymer 1) is synthesized as follows:

A 500 ml separable round-bottomed flask (polymerization container) is placed under nitrogen, and n-hexane (dried over molecular sieves, 23.8 ml) and butyl chloride (dried over molecular sieves, 214.4 ml) are then added by means of a syringe. The polymerization container is then cooled by immersion in a dry ice/methanol bath at −70° C. A Teflon feed tube is connected to a pressure-resistant glass collection flask equipped with a three-way tap and containing isobutylene (75 ml, 794 mmol), the isobutylene is added to the polymerization container by means of a nitrogen pressure. p-Dicumyl chloride (0.1248 g, 0.540 mmol) and α-picoline (0.1026 g, 1.10 mmol) are then added. Titanium tetrachloride (0.84 ml, 7.70 mmol) is then added so as to start the polymerization. After stirring for one hour at the same temperature (−70° C.), a sample of the polymerization solution (approximately 1 ml) is extracted from the total polymerization solution.

Styrene (9.79 g, 94.1 mmol), previously cooled to −70° C., is then added to the polymerization container. 45 min after addition of the styrene, the polymerization solution is poured into hot water (500 ml) in order to stop the reaction and this mixture is then stirred for 30 min. The polymerization solution is then washed with deionized water (3×500 ml). The solvent and the analogues are evaporated from the washed crude reaction product under reduced pressure at 80° C. for 24 hours to obtain the block copolymer. The weight-average molecular weights of the central block (polyisobutylene) and of the total block copolymer are measured by gel permeation chromatography (GPC) as defined above and the glass transition temperature is measured according to the DMA method as defined above. These data are collated in Table I below.

Example 2: Preparation of a Comparative Block Copolymer (Polymer 2)-β-Pinene-Co-Styrene/Isobutylene/β-Pinene-Co-Styrene Block Copolymer The block copolymer (polymer 2) is synthesized as follows:

A 2 litre separable round-bottomed flask (polymerization container) is placed under nitrogen, and n-hexane (dried over molecular sieves, 192 ml) and butyl chloride (dried over molecular sieves, 768 ml) are then added by means of a syringe. The polymerization container is then cooled by immersion in a dry ice/methanol bath at −70° C. A Teflon feed tube is connected to a pressure-resistant glass collection flask equipped with a three-way tap and containing isobutylene (175 ml, 1852 mmol), the isobutylene is added to the polymerization container by means of a nitrogen pressure. p-Dicumyl chloride (0.1413 g, 0.611 mmol) and α-picoline (1.709 g, 18.3 mmol) are then added. Titanium tetrachloride (5.36 ml, 48.9 mmol) is then added so as to start the polymerization. After stirring for 65 minutes at the same temperature (−70° C.), a sample of the polymerization solution (approximately 1 ml) is extracted from the total polymerization solution.

Styrene (28.9 ml, 251 mmol) is then added. Once the styrene addition has ended, β-pinene (3.64 ml, 23.2 mmol) is added dropwise for 40 min. Once the β-pinene addition has ended, titanium tetrachloride (1.79 ml, 16.3 mmol) is once again added and the mixture is stirred for 50 min. Afterwards, the polymerization solution is poured into hot water (2 litres) in order to stop the reaction and this mixture is then stirred for 30 min. The polymerization solution is then washed with deionized water (3×2 litres). The solvent and the analogues are evaporated from the washed crude reaction product under reduced pressure at 80° C. for 24 hours to obtain the block copolymer. The weight-average molecular weights of the central block (polyisobutylene) and of the total block copolymer are measured by gel permeation chromatography (GPC) as defined above and the glass transition temperature is measured according to the DMA method as defined above. These data are collated in Table I below.

Example 3: Preparation of a Comparative Block Copolymer (Polymer 3)-β-Pinene/Styrene/Isobutylene/Styrene/β-Pinene Block Copolymer The block copolymer (polymer 3) is synthesized as follows:

A 2 litre separable round-bottomed flask (polymerization container) is placed under nitrogen, and n-hexane (dried over molecular sieves, 192 ml) and butyl chloride (dried over molecular sieves, 768 ml) are then added by means of a syringe. The polymerization container is then cooled by immersion in a dry ice/methanol bath at −70° C. A Teflon feed tube is connected to a pressure-resistant glass collection flask equipped with a three-way tap and containing isobutylene (175 ml, 1852 mmol), the isobutylene is added to the polymerization container by means of a nitrogen pressure. p-Dicumyl chloride (0.1413 g, 0.611 mmol) and α-picoline (1.7091 g, 18.3 mmol) are then added. Titanium tetrachloride (5.36 ml, 48.9 mmol) is then added so as to start the polymerization. After stirring for 90 minutes at the same temperature (−70° C.), a sample of the polymerization solution (approximately 1 ml) is extracted from the total polymerization solution.

The styrene (28.9 ml, 251 mmol) is then added and the medium is stirred until the degree of conversion of the styrene has reached 70%. The conversion of the styrene is monitored by gas chromatography. Then, the β-pinene (3.64 ml, 23.2 mmol), previously cooled to −70° C., is added to the polymerization container.

After 30 minutes, titanium tetrachloride (0.30 ml, 2.74 mmol) is added again and the medium is stirred for 20 minutes. The polymerization solution is then poured into hot water (2 litres) in order to stop the reaction and this mixture is then stirred for 30 min. The polymerization solution is then washed with deionized water (3×2 l). The solvent and the analogues are evaporated from the washed crude reaction product under reduced pressure at 80° C. for 24 hours to obtain the block copolymer. The weight-average molecular weights of the central block (polyisobutylene) and of the total block copolymer are measured by gel permeation chromatography (GPC) as defined above and the glass transition temperature is measured according to the DMA method as defined above. These data are collated in Table I below.

Example 4: Preparation of a Block Copolymer which can be Used in the Pneumatic Object According to the Invention (Polymer 4)-(β-Pinene-Co-α-Methylstyrene)/Styrene/Isobutylene/Styrene/(β-Pinene-Co-α-Methylstyrene) Block Copolymer The block copolymer (polymer 4) is synthesized as follows: A 1 litre separable round-bottomed flask (polymerization container) is placed under nitrogen, and n-hexane (dried over molecular sieves, 121 ml) and butyl chloride (dried over molecular sieves, 485 ml) are then added by means of a syringe. The polymerization container is then cooled by immersion in a dry ice/methanol bath at −70° C. A Teflon feed tube is connected to a pressure-resistant glass collection flask equipped with a three-way tap and containing isobutylene (100 ml, 1059 mmol), the isobutylene is added to the polymerization container by means of a nitrogen pressure. p-Dicumyl chloride (0.0808 g, 0.350 mmol) and α-picoline (0.9773 g, 10.5 mmol) are then added. Titanium tetrachloride (3.07 ml, 28.0 mmol) is then added so as to start the polymerization. After stirring for 120 minutes at the same temperature (−70° C.), a sample of the polymerization solution (approximately 1 ml) is extracted from the total polymerization solution.

The styrene (0.80 ml, 6.99 mmol) is added and the medium is stirred for 15 minutes. Then, titanium tetraisopropoxide (2.73 ml, 9.22 mmol) is added and the medium is stirred for 10 min. Then, β-pinene (2.08 ml, 13.3 mmol) and α-methylstyrene (18.8 ml, 143 mmol) are added and the medium is stirred until the degree of conversion of the α-methylstyrene has reached 70%. The conversion of the styrene is monitored by gas chromatography.

The polymerization solution is then poured into hot water (1 litre) in order to stop the reaction and this mixture is then stirred for 30 min. The polymerization solution is then washed with deionized water (3×1 l). The solvent and the analogues are evaporated from the washed crude reaction product under reduced pressure at 80° C. for 24 hours to obtain the block copolymer. The weight-average molecular weights of the central block (polyisobutylene) and of the total block copolymer are measured by gel permeation chromatography (GPC) as defined above and the glass transition temperature is measured according to the DMA method as defined above. These data are collated in Table I below.

TABLE I

This table collates the values for weight-average molar mass (Mw), the contents of units derived from β-pinene in moles relative to the number of moles of units of the block copolymer (% β-pinene) and the percentage by weight of the thermoplastic block(s) relative to the total weight of the block copolymer (% TP blocks).

|  | Mw (kg/mol) | % β-pinene | % TP blocks | Tg of elastomeric block |
|---|---|---|---|---|
| Polymer 1 | 100 | 0 | 15 | −60° C. |
| Polymer 2 | 200 | 1.1 | 15 | −62° C. |
| Polymer 3 | 200 | 1.1 | 15 | −60° C. |
| Polymer 4 | 200 | 1.2 | 15 | −61° C. |

Example 5: Preparation and Evaluation of Elastomer Layer which is Gastight to Inflation Gases and which can be Used in the Pneumatic Object According to the Invention (Matrix 100% Block Copolymer)

The block copolymers obtained (polymers 1 to 4) were formulated in layers that are gastight to inflation gases, consisting of 100% of block copolymer (layers 1 to 4, respectively).

The gastight elastomer thermoplastic layers of the invention are prepared in a conventional manner, for example by incorporation of the block copolymer into a twin-screw extruder, so as to melt the matrix, followed by the use of a flat die for preparing the thermoplastic layer. More generally, the thermoplastic layer may be formed via any method known to a person skilled in the art: extrusion, calendering, extrusion-blow moulding, injection moulding or cast film.

The properties of these gastight layers were then evaluated.

The data are collated in Table II below.

TABLE II

This table collates the standardized values (relative to layer 1) for gastightness, adhesion and heat resistance of the elastomer layers prepared by means of the above block copolymers synthesized beforehand.

|  | Gastightness | Adhesion | Heat resistance |
|---|---|---|---|
| Layer 1 | 100 | 100 | 100 |
| Layer 2 | 100 | 320 | 113 |
| Layer 3 | 92 | 520 | 118 |
| Layer 4 | 122 | 480 | 119 |

The elastomer layer which can be used according to the invention (layer 4) has an unexpected synergistic effect, especially in terms of gastightness.

In particular, with the same content of β-pinene and the same percentage by weight of the thermoplastic block(s) as the comparative layers 2 and 3, the layer which can be used according to the invention, 4, has equivalent adhesion and heat resistance but better gastightness, even though layers 2 and 3 already show good results.

This reflects the effect of the particular architecture and of the particular composition of the block copolymer constituting the elastomer layer which can be used according to the invention, and in particular of the presence of α-methylstyrene.

The invention claimed is:

1. A pneumatic object provided with an elastomer layer which is gastight to inflation gases, said elastomer layer comprising, as predominant elastomer, a thermoplastic elastomer in the form of a block copolymer which comprises:
   (a) an elastomeric block comprising at least units derived from isobutylene, and having a glass transition temperature of less than or equal to −20° C., and
   (b) one or more thermoplastic blocks, the one or more thermoplastic blocks each comprising at least one first block consisting of units derived from at least one polymerizable monomer and at least one second block, said at least one second block being a random copolymer consisting of units derived from α-methylstyrene and of units derived from β-pinene,
   wherein a content of units derived from β-pinene ranges from 0.5 to 25 mol % relative to the number of moles of units of the block copolymer.

2. The pneumatic object according to claim 1, wherein the block copolymer has a structure in which the elastomeric block is connected at one of its ends to a thermoplastic block.

3. The pneumatic object according to claim 1, wherein the block copolymer has a linear structure in which the elastomeric block is connected at each of its ends to a thermoplastic block.

4. The pneumatic object according to claim 1, wherein the block copolymer has a star-branched structure, the elastomeric block being central and being connected to 3 to 12 branches, each branch consisting of a thermoplastic block.

5. The pneumatic object according to claim 1, wherein the at least one polymerizable monomer is selected from styrene monomers.

6. The pneumatic object according to claim 5, wherein the at least one polymerizable monomer is styrene.

7. The pneumatic object according to claim 1, wherein the block copolymer has a weight-average molecular weight ranging from 30 to 300 kg/mol.

8. The pneumatic object according to claim 7, wherein the block copolymer has a weight-average molecular weight ranging from 120 to 250 kg/mol.

9. The pneumatic object according to claim 1, wherein the content of units derived from β-pinene ranges from 0.8 to 5 mol % relative to the number of moles of units of the block copolymer.

10. The pneumatic object according to claim 1, wherein the one or more thermoplastic blocks represent from 5 to 30% by weight relative to the total weight of the block copolymer.

11. The pneumatic object according to claim 10, wherein the one or more thermoplastic blocks represent from 10 to 20% by weight relative to the total weight of the block copolymer.

12. The pneumatic object according to claim 1, wherein the elastomeric block has a glass transition temperature of less than or equal to −40° C.

13. The pneumatic object according to claim 12, wherein the elastomeric block has a glass transition temperature of less than or equal to −50° C.

14. The pneumatic object according to claim 1, wherein the elastomeric block comprises from 0.5 to 6% by weight of units derived from one or more conjugated dienes relative to the total weight of the elastomeric block.

15. The pneumatic object according to claim 14, wherein the elastomeric block comprises from 1.5 to 5% by weight of units derived from one or more conjugated dienes relative to the total weight of the elastomeric block.

16. The pneumatic object according to claim 15, wherein the one or more conjugated dienes are selected from the group consisting of isoprene, 1,3-butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene, and mixtures thereof.

17. The pneumatic object according to claim 1, wherein the elastomer layer which is gastight to inflation gases further comprises an extending oil.

18. The pneumatic object according to claim 17, wherein the extending oil is selected from the group consisting of polyolefinic oils, paraffinic oils, naphthenic oils, aromatic oils, mineral oils and mixtures thereof.

19. The pneumatic object according to claim 18, wherein the extending oil is selected from olefinic oils.

20. The pneumatic object according to claim 19, wherein the extending oil is a polyisobutylene oil.

21. The pneumatic object according to claim 17, wherein the extending oil has a number-average molar mass ranging from 350 to 4000 g/mol.

22. The pneumatic object according to claim 21, wherein the extending oil has a number-average molar mass ranging from 400 to 3000 g/mol.

23. The pneumatic object according to claim 17, wherein the extending oil has a content of greater than 5 phr.

24. The pneumatic object according to claim 23, wherein the extending oil has a content between 5 and 100 phr.

25. The pneumatic object according to claim 1, wherein the elastomer layer has a thickness of greater than or equal to 0.05 mm.

26. The pneumatic object according to claim 25, wherein the elastomer layer has a thickness ranging from 0.1 to 10 mm.

27. The pneumatic object according to claim 26, wherein the elastomer layer has a thickness ranging from 0.1 to 2 mm.

28. The pneumatic object according to claim 1, wherein the elastomer layer is arranged on the inner wall of the pneumatic object.

29. The pneumatic object according to claim 1, wherein the pneumatic object is a pneumatic tire.

30. A process for rendering a pneumatic object gastight to inflation gases comprising the step of:
   incorporating the elastomer layer which is gastight to inflation gases into the pneumatic object according to claim 1 during the manufacture of the pneumatic object or after the manufacture of the pneumatic object.

31. The process according to claim 30, wherein the elastomer layer is arranged on the inner wall of the pneumatic object.

32. The process according to claim 30, wherein the pneumatic object is a pneumatic tire.

33. The process according to claim 32, wherein the incorporating step includes depositing the elastomer layer on a tire-building drum before covering said elastomer layer a remainder of the structure of the pneumatic tire.

* * * * *